United States Patent
Burton et al.

(10) Patent No.: US 7,133,989 B2
(45) Date of Patent: Nov. 7, 2006

(54) POINT IN TIME COPY BETWEEN DATA STORAGE SYSTEMS

(75) Inventors: Helena Cornelia Burton, Vail, AZ (US); Michael E Factor, Haifa (IL); Timothy Alan Griffin, Tucson, AZ (US); Thomas Charles Jarvis, Tucson, AZ (US); William Frank Micka, Tucson, AZ (US); Yoram Novick, Cupertino, CA (US); Gail Andrea Spear, Tuscon, AZ (US); Sam Clark Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 10/839,034

(22) Filed: May 5, 2004

(65) Prior Publication Data

US 2005/0251634 A1 Nov. 10, 2005

(51) Int. Cl.
*G06F 11/00* (2006.01)
(52) U.S. Cl. ..................................... 711/162; 711/161
(58) Field of Classification Search ............... None
See application file for complete search history.

(56) References Cited

U.S. PATENT DOCUMENTS

| | | | |
|---|---|---|---|
| 6,446,175 B1 * | 9/2002 | West et al. ................. | 711/162 |
| 6,557,089 B1 | 4/2003 | Reed et al. ................. | 711/162 |
| 6,643,671 B1 * | 11/2003 | Milillo et al. ............... | 707/204 |
| 6,728,736 B1 * | 4/2004 | Hostetter et al. ........... | 707/204 |
| 2002/0069369 A1 | 6/2002 | Tremain ..................... | 713/201 |
| 2002/0133512 A1 | 9/2002 | Milillo et al. ............... | 707/204 |
| 2002/0199059 A1 | 12/2002 | Riedle et al. ............... | 711/114 |
| 2003/0028723 A1 | 2/2003 | Segev et al. ................ | 711/113 |
| 2003/0074523 A1 | 4/2003 | Johnson ...................... | 711/112 |
| 2003/0088638 A1 | 5/2003 | Gluck et al. ................ | 709/217 |
| 2003/0110471 A1 | 6/2003 | Asco et al. ................. | 717/120 |
| 2003/0158869 A1 | 8/2003 | Micka ........................ | 707/203 |
| 2003/0187887 A1 | 10/2003 | Beal .......................... | 707/204 |

\* cited by examiner

*Primary Examiner*—T Nguyen
(74) *Attorney, Agent, or Firm*—John H. Holcombe

(57) ABSTRACT

A target data storage system comprises a peer-to-peer communication link interface for linking the target to a source data storage system, and data storage for storing point in time copy data received from the source via the peer-to-peer communication link interface. Information is established at the target relating logical identification of the point in time copy data to point in time copy data stored at the target and to point in time copy data stored at the source, such that the information references the data storage system having requested point in time copy data. A controller of the target accesses requested point in time copy data at the target if the table indicates that the requested point in time copy data is available at the target; else obtains the requested point in time copy data from the source via the peer-to-peer communication link interface.

30 Claims, 3 Drawing Sheets

POINT IN TIME COPY BETWEEN DATA STORAGE SYSTEMS

FIELD OF THE INVENTION

This invention relates to providing a point in time copy of data, also called flashcopy, and, more particularly, to providing a point in time copy between data storage systems across data storage system boundaries.

BACKGROUND OF THE INVENTION

When data or files may be updated or used for testing, etc., point in time copying is used to preserve an original copy of the data as of one point in time. Point in time copying is conducted in a data storage system to preserve the data without waiting for all the data to be physically copied. At a point in time, the data at that time is considered original data, and any subsequent updates to the data modify that data, which is then called updated data. Access to the point in time data may be conducted with the original point in time copy directly from the source if the data has not been updated, and from the target if the original data at the source was updated.

Point in time copying is as of a point in time, unlike synchronous mirroring which is a continuous process of copying data as it updated, but which prevents any updating from occurring by failing to complete the updating storage transaction for the data at a source until after that updating data has also been stored at a target. Asynchronous mirroring also is continuous, but may appear to be quicker, and is a complex process that requires that the updating data is first stored by the source data storage, and requires that safeguards are in place to assure that it will ultimately be stored at the target data storage.

Customers would prefer the point in time copy target to be at a location remote from the source, or at a separate data storage machine. Copying point in time data to a remote location or to another data storage machine typically is accomplished by a host system which copies the data to the remote location or another data storage machine, and the data is typically not immediately available from the target, which must wait until all the point in time data has been copied.

SUMMARY OF THE INVENTION

The present invention comprises an information handling system, a controller, a computer program product, and a method, for providing a point in time copy of data between a source data storage system and a target data storage system.

In one embodiment, the target data storage system comprises a peer-to-peer communication link interface for linking the target data storage system to the source data storage system; data storage for storing point in time copy data received from the source data storage system via the peer-to-peer communication link interface; and a table establishing information relating logical identification of the point in time copy data to point in time copy data stored at the target data storage system and to point in time copy data stored at the source data storage system, such that the information of the table may reference the one of the data storage systems having requested point in time copy data. Further, a controller of the target data storage system accesses requested point in time copy data at the target data storage system if the information of the table indicates that the requested point in time copy data is available at the target data storage system; else, obtains the requested point in time copy data from the source data storage system via the peer-to-peer communication link interface.

In another embodiment, the controller obtains the requested point in time copy data from the source data storage system by sending at least one command to the source data storage system via the peer-to-peer communication link interface, and operates the information handling system to receive obtained data from the source data storage system via the peer-to-peer communication link interface.

In still another embodiment, the controller establishes the information of the table comprising the logical identification of the point in time copy data, and additionally updates the information of the table to identify which data storage system presently stores data of the point in time copy, and the present status of the data of the point in time copy.

In a further embodiment, the logical identification of the point in time copy data is received from the source data storage system via the peer-to-peer communication link interface.

In a still further embodiment, wherein the target data storage system comprises cache and/or nonvolatile storage, the information of the table is stored in the cache and/or nonvolatile storage.

In another embodiment, wherein the data storage of the target data storage system comprises cache storage and/or nonvolatile storage and disk data storage, the received point in time copy data is initially stored in the cache storage and/or nonvolatile storage and destaged to the disk data storage in a predetermined manner.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
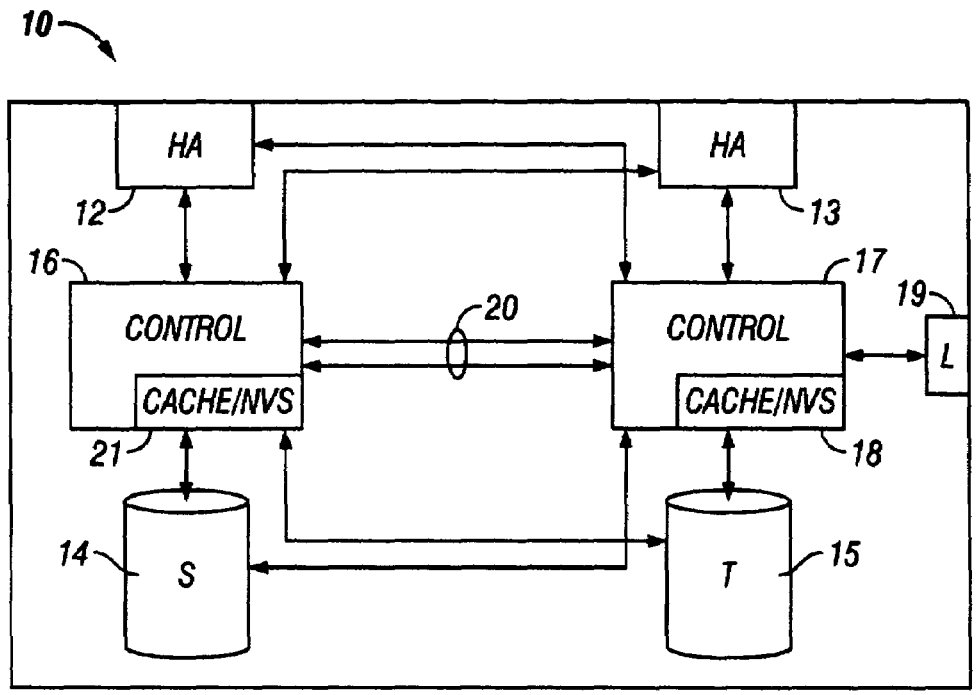
FIG. 1 is a diagrammatic illustration of a prior art data storage system.

FIG. 1 illustrates a prior art data storage system (server) 10 which provides a local point in time copy. A plurality of host adapters 12, 13 provide interfaces to one or more host systems which are conducting storage activity with respect to a plurality of disks 14, 15 of the data storage system 10. One or more controllers 16, 17 operate the data storage system 10 and are provided with cache storage and/or nonvolatile storage 18, 21. The cache storage and/or nonvolatile storage may be separated for each controller, or may comprise a common cache. Typically, cache storage comprises random access electronic memory which is volatile, and nonvolatile storage (NVS) comprises memory that retains information after power is cut off. Each of the controllers 16, 17 may directly access the disks 14, 15. One or more communication link interfaces 19 are provided to allow communication with other data storage systems, for example, to provide backup by transmitting the data to the other data storage systems.

Local prior art point in time copying is used to preserve an original copy of the data immediately, and is conducted in a data storage system. In one example, the original data is stored by the data storage system 10 in cache storage and/or nonvolatile storage 21 and destaged to disk storage 14 by controller 16. Controllers 16 and 17 communicate with each other by means of internal mail at links 20. Updates to the data are conducted by controller 16, and the original data is forwarded to controller 17, and preserved by controller 17 at cache storage/NVS 18 and destaged to disk storage 15. Alternatively, disk storage 14 and storage 15 may comprise a common cluster, and both copies of the original data may be stored in the same cluster of disk storage 14, 15.

The physical location of the original data, and other information regarding the data, is maintained by controller 16 and/or controller 17. A request for data of the point in time copy, for example, a read request at host adapter 13, is responded to by controller 17. If the data has been updated at disk storage 14 by controller 16, controller 17 accesses the original data from cache storage/NVS 18 and/or disk storage 15. If the data has not been updated, controller 17 communicates by mail 20 with controller 16 to find the location and status, etc., of the data, and then directly accesses the original data from disk storage 14.

As discussed above, customers may prefer that the point in time copy data is stored in a separate, or remote, data storage system.

Figure 2:
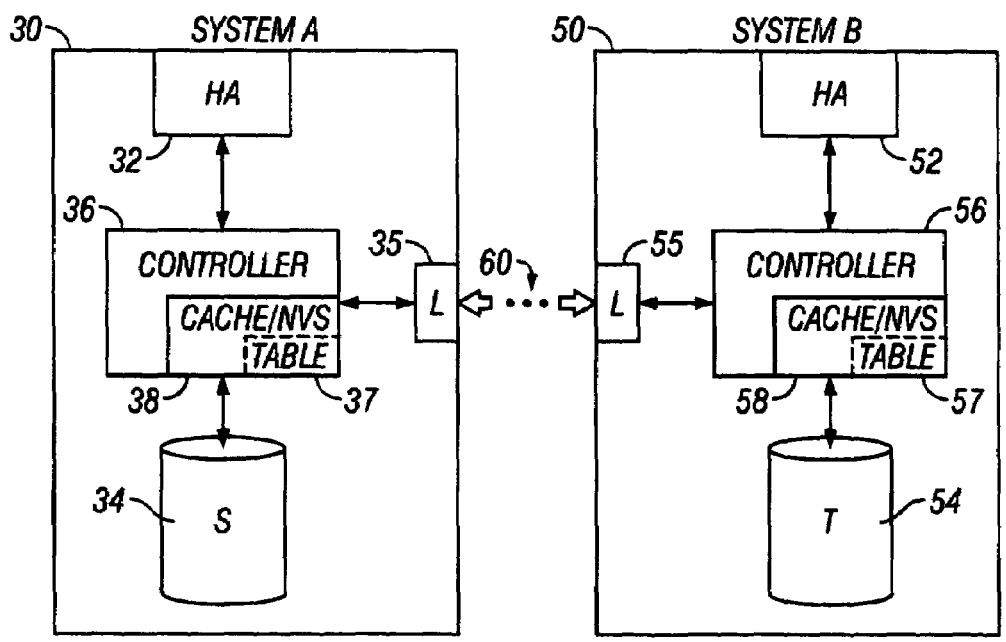
FIG. 2 is a diagrammatic illustration of source and target data storage systems in which the present invention may be implemented.

FIG. 2 illustrates two data storage systems 30 and 50 in which the present invention may be implemented for providing a point in time copy of data between a source data storage system and a target data storage system, in which the point in time copy is immediately available. In the parlance of data storage technology, each of the data storage systems 30 and 50 may be referred to as a "subsystem" or a "server".

In one embodiment, data storage system 30 comprises a source data storage system for point in time copying between data storage systems, and data storage system 50 comprises a target data storage system for point in time copying between data storage systems. The data storage systems 30 and 50 may comprise any server or servers and/or complex of devices that are capable of providing for the storage of data. Examples include data storage subsystems such as the IBM Enterprise Storage Server (ESS), also called the IBM 2105, or other data storage systems having magnetic disk drives in single or in RAID (redundant array of independent—or inexpensive—disks) configuration, optical drives in single or in library subsystem configuration, etc.

In the present example, each data storage system 30 and 50 comprises a plurality of host adapters 32, 52 which provide interfaces to one or more host systems which are conducting storage activity with respect to the data storage system. Disk data storage 34, 54 and cache storage and/or nonvolatile storage (NVS) 38, 58 are provided by each of the data storage systems 30 and 50, for the storage of data and/or tables 37, 57 and other information. Typically, disk data storage comprises a plurality of magnetic disk drives, however, alternative storage devices may be employed in accordance with the present invention as discussed above. Typically, cache storage and nonvolatile storage comprise random access electronic memory, however, any suitable type of random access data storage may be employed having relatively faster access characteristics than the disk data storage. One or more controllers 36, 56 operate the data storage system 30, 50. The controllers comprise any suitable processing system, processor or processors. One example comprises an IBM Power PC Processor. The controllers may be implemented as at least one programmable computer processor, and having computer program products usable therewith, the computer program product having computer readable code embodied therein for operating the programmable computer processor(s). The computer program product may be implemented in any suitable form, as is known to those of skill in the art. The layout of multiple controller systems may be similar to that of data storage system 10 of FIG. 1.

Peer-to-peer communication link interfaces 35, 55 are provided for the source data storage system 30 and the target data storage system 50 for linking the target data storage system to the source data storage system. Interfaces for other peer-to-peer communication links and/or other communication links may be provided for communication with other data storage systems, for example, for backup by transmitting the data to the other data storage systems. The peer-to-peer communication link interfaces 35, 55, and the communication facilities 60 may comprise SCSI, ESCON, Fibre Channel Protocol, etc., as are known to those of skill in the art.

In accordance with the present invention, point in time copy data is provided by the source data storage system 30 and is received by the target data storage system 50 via the peer-to-peer communication link interfaces 35, 55, and the controller 56 of the target data storage system 50 initially stores the data in the cache/NVS storage 58 and destages some or all of the data to the disk data storage 54 in a predetermined manner.

The source data storage system also provides information regarding the logical identification of the point in time copy data to the target data storage system via the peer-to-peer communication link interfaces 35, 55, and the controller 56 of the target data storage system establishes information relating logical identification of the point in time copy data to point in time copy data stored at the target data storage system and to point in time copy data stored at the source data storage system. A part of the information may comprise one or more bit maps indicating data has been copied from the source data storage system to the target data storage system. The information may be stored in the form of a table 57. The term "table" as employed herein comprises a logical grouping of information having any suitable format or implementation. Thus, the information of the table references the one of the data storage systems having requested point in time copy data. In one embodiment, the table 57 is stored in cache storage and/or NVS 58. Alternatively, the table is stored in the memory or other storage of the controller 56. Still alternatively, the table is stored in disk storage 54 as an alternative nonvolatile storage. The controller updates the information to identify any changes as to which data storage system presently stores data of the point in time copy, and the present status of the data of the point in time copy.

A request for data may be received by the target data storage system 50, for example, from a host system at host adapter 52. The controller 56 consults the information of the table 57, and if the information of the table indicates that the requested point in time copy data is available at the target data storage system, for example, at cache/NVS storage 58, the controller accesses the data from cache/NVS, and provides the data at host adapter 52 to the requester. If the information of the table 57 indicates that the requested point in time copy data is available instead at the source data storage system 30, and has not been updated, the controller 56 obtains the requested point in time copy data from the source data storage system 30 via the peer-to-peer communication link interface 55. The form for obtaining the data is by an access command or by a request for data by controller 56 via the peer-to-peer communication link interface 55. The controller 36 of the source data storage 30 receives the command or request at peer-to-peer communication link interface 35, accesses the data, for example, from cache/NVS storage 38 or from disk data storage 34, and provides the data at peer-to-peer communication link interface 35 for the target data storage system 50. Controller 56 receives the data at peer-to-peer communication link interface 55, and will store the data to cache storage and/or NVS 58 and migrated to disk data storage 54, and provides the data at host adapter 52 to the requestor.

Figure 3:
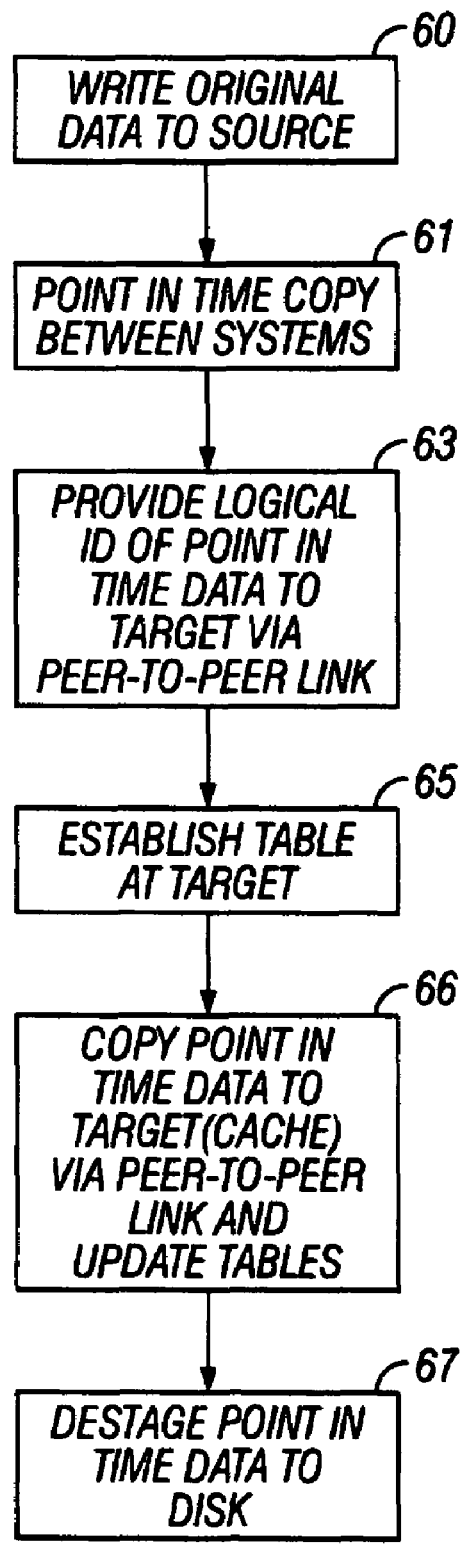
FIG. 3 is a flow chart depicting an embodiment of the present invention for providing the point in time copy at a target data storage system of FIG. 2.
Figure 4:
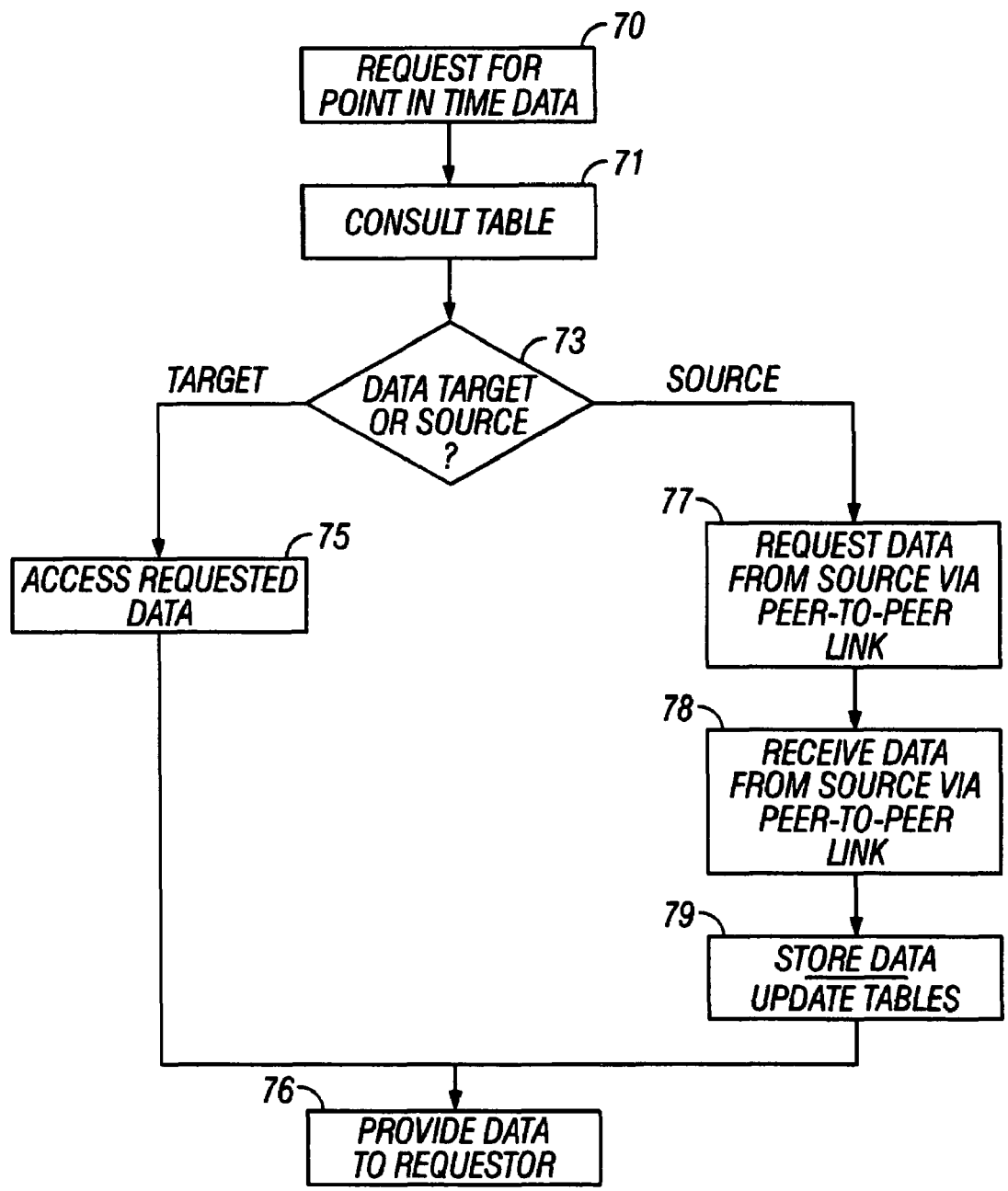
FIG. 4 is a flow chart depicting an embodiment of the present invention for providing point in time data to a requestor.

FIGS. 3 and 4 illustrate embodiments of the present invention for providing and maintaining the point in time copy at a target data storage system 50 of FIG. 2; and for providing point in time data to a requester.

Referring to FIGS. 2 and 3, the point in time copying begins after receipt of data to be written in step 60. In step 60, data that will become original data is written to the source data storage system 30, for example, by a write from a host system received at host adapter 32. At a point in time 61, selected data of the data storage system 30 is considered original data, or source data. Subsequent updates to the data that modify data are then considered updated data.

In step 63, the controller 36 of the source data storage system 30 provides information regarding the logical identification of the point in time copy data to the target data storage system 50 via the peer-to-peer communication link interfaces 35, 55. This information comprises the logical identification of the data, and its status. The status may comprise the fact that the data is stored at the source data storage system, and additional information about when the data was created, etc.

In step 65, the controller 56 of the target data storage system 50 establishes information for the table 57 relating logical identification of the point in time copy data to point in time copy data stored at the target data storage system and to point in time copy data stored at the source data storage system. Thus, the information of the table may reference the one of the data storage systems having requested point in time copy data. The information may also comprise the status of the data, and other useful information. Data of the point in time copy is then forwarded from the source data storage system 30 to the target data storage system 50 via the peer-to-peer communication link interfaces 35, 55. Data may be forwarded on a schedule, or as the original data is to be updated. For example, a host system may provide a write to the source data storage system 30, or a write may be expected momentarily, and before the data can be stored to disk, and the controller 36 insures that the original data is preserved by forwarding the original data to the target data storage system.

In step 66, controller 56 of the target data storage system 50 receives the point in time copy information and data at peer-to-peer communication link interface 55 and stores the data, for example, in cache/NVS storage 58. The controller 56 (and controller 36) updates the information of the table 57 (and table 37) to identify the change as to which data storage system presently stores data of the point in time copy, and may update the present status of the data of the point in time copy. In step 67, if the controller initially stores the data in the cache/NVS storage 58, the controller destages some or all of the data to the disk data storage 54 in a predetermined manner, as discussed above.

Referring to FIGS. 2 and 4, a request for data of the point in time copy is requested in step 70. The request is received by the target data storage system, for example, from a host system at host adapter 52.

In step 71, the controller 56 consults the information of the table 57, and the result is indicated by step 73. If the information, in step 73, indicates that the requested point in time copy data is available at the target data storage system, for example, at cache/NVS storage 58 or migrated to disk data storage 54, in step 75, the controller accesses the data from cache and/or NVS or disk data storage, and, in step 76, provides the data at host adapter 52 to the requester.

If, in step 73, the information of the table 57 indicates that the requested point in time copy data is available instead at the source data storage system 30, and has not been updated, in step 77, the controller 56 obtains the requested point in time copy data from the source data storage system 30 via the peer-to-peer communication link interface 55. The form for obtaining the data is by an access command or by a request for data by controller 56 via the peer-to-peer communication link interface 55. An access command may be called a "pull" of the requested point in time copy data by the controller 56. A request for data by controller 56 and a resultant forwarding of the data by controller 36 may be called a "push" of the requested point in time copy data. Those of skill in the art may envision other means for obtaining the requested point in time copy data.

The controller 36 of the source data storage 30 receives the request at peer-to-peer communication link interface 35, accesses the data, for example, from cache/NVS storage 38 or from disk data storage 34, and provides the data at peer-to-peer communication link interface 35 for the target data storage system 50. In step 78, controller 56 receives the data at peer-to-peer communication link interface 55, and, in step 79, may store the data, for example, in cache/NVS data storage 58 and eventually to the disk data storage 54. Tables 37 and 57 are then updated to indicate where the original data is located. In some embodiments, the controller 56 may store the data in the disk data storage 54, and update the information of table 57 to indicate that the data resides at the target 50, prior to providing the data to the requestor.

In step 76, controller 36 of the source data storage 30 provides the data at host adapter 52 to the requestor.

The illustrated components of the data storage systems 30 and 50 may be altered and functions varied, as is known to those of skill in the art. The illustrated steps of FIGS. 3 and 4 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An information handling system for providing a point in time copy of data between a source data storage system and a target data storage system, comprising:

a peer-to-peer communication link interface of said target data storage system for linking said target data storage system to said source data storage system;

data storage of said target data storage system for storing point in time copy data received from said source data storage system via said peer-to-peer communication link interface;

a table of said target data storage system establishing information relating logical identification of said point in time copy data to point in time copy data stored at said target data storage system and to point in time copy data stored at said source data storage system, such that said information of said table may reference the one of said data storage systems having requested point in time copy data; and a controller of said target data storage system accessing requested point in time copy data at said target data storage system if said information of said table indicates that said requested point in time copy data is available at said target data storage system; else obtaining said requested point in time copy data from said source data storage system via said peer-to-peer communication link interface.

2. The information handling system of claim 1, wherein said controller obtains said requested point in time copy data from said source data storage system by sending at least one command to said source data storage system via said peer-to-peer communication link interface, and operates said information handling system to receive obtained data from said source data storage system via said peer-to-peer communication link interface.

3. The information handling system of claim 2, wherein said controller establishes said information of said table comprising said logical identification of said point in time copy data, and additionally updates said information of said table to identify which said data storage system presently stores data of said point in time copy, and the present status of said data of said point in time copy.

4. The information handling system of claim 3, wherein said logical identification of said point in time copy data is received from said source data storage system via said peer-to-peer communication link interface.

5. The information handling system of claim 3, wherein said target data storage system comprises cache storage and/or nonvolatile storage, and said information of said table is stored in said cache storage and/or nonvolatile storage.

6. The information handling system of claim 1, wherein said data storage of said target data storage system comprises cache storage and/or nonvolatile storage and disk data storage, and said received point in time copy data is initially stored in said cache storage and/or nonvolatile storage and destaged to said disk data storage in a predetermined manner.

7. A controller of a data storage system, said data storage system comprising a target data storage system comprising: a peer-to-peer communication link interface for linking said target data storage system to a source data storage system; and data storage for storing point in time copy data received from said source data storage system via said peer-to-peer communication link interface; said controller:

managing information relating logical identification of said point in time copy data to point in time copy data stored at said target data storage system and to point in time copy data stored at said source data storage system, such that said information may reference the one of said data storage systems having requested point in time copy data; and accessing requested point in time copy data at said target data storage system if said information indicates that said requested point in time copy data is available at said target data storage system; else obtaining said requested point in time copy data from said source data storage system via said peer-to-peer communication link interface.

8. The controller of claim 7, wherein said controller obtains said requested point in time copy data from said source data storage system by sending at least one command to said source data storage system via said peer-to-peer communication link interface, and operates said target data storage system to receive obtained data from said source data storage system via said peer-to-peer communication link interface.

9. The controller of claim 8, wherein said controller manages said information, establishing said information comprising said logical identification of said point in time copy data, and updating said information to identify which said data storage system presently stores data of said point in time copy, and the present status of said data of said point in time copy.

10. The controller of claim 9, wherein said controller to operates said target data storage system to receive said logical identification of said point in time copy data from said source data storage system via said peer-to-peer communication link interface.

11. The controller of claim 9, wherein said target data storage system comprises cache data storage and/or nonvolatile storage, and said controller stores said information in said cache storage and/or nonvolatile storage.

12. The controller of claim 7, wherein said data storage of said target data storage system comprises cache storage and/or nonvolatile storage and disk data storage, and said controller initially stores said received point in time copy data in said cache storage and/or nonvolatile storage and destages said received point in time copy data to said disk data storage in a predetermined manner.

13. A computer program product usable with at least one programmable computer processor having computer readable code embodied therein, said at least one programmable computer processor for providing a point in time copy of data between a source data storage system and a target data storage system; said target data storage system comprising: a peer-to-peer communication link interface for linking said target data storage system to a source data storage system; and data storage for storing point in time copy data received from said source data storage system via said peer-to-peer communication link interface; said computer program product comprising:

computer readable program code causing said at least one programmable computer processor to manage information relating logical identification of said point in time copy data to point in time copy data stored at said target data storage system and to point in time copy data stored at said source data storage system, such that said information may reference the one of said data storage systems having requested point in time copy data; and computer readable program code causing said at least one programmable computer processor to access requested point in time copy data at said target data storage system if said information indicates that said requested point in time copy data is available at said target data storage system; else to obtain said requested point in time copy data from said source data storage system via said peer-to-peer communication link interface.

14. The computer program product of claim 13, wherein said computer readable program code which causes said at least one programmable computer processor to obtain said requested point in time copy data from said source data storage system comprises causing said at least one programmable computer processor to send at least one command to said source data storage system via said peer-to-peer communication link interface, and to operate said target data storage system to receive obtained data from said source data storage system via said peer-to-peer communication link interface.

15. The computer program product of claim 14, wherein said computer readable program code which causes said at least one programmable computer processor to manage said information, causes said at least one programmable computer processor to establish said information comprising said logical identification of said point in time copy data, and to update said information to identify which said data storage system presently stores data of said point in time copy, and the present status of said data of said point in time copy.

16. The computer program product of claim 15, wherein said computer readable program code causes said at least one programmable computer processor to operate said target data storage system to receive said logical identification of said point in time copy data from said source data storage system via said peer-to-peer communication link interface.

17. The computer program product of claim 15, wherein said target data storage system comprises cache storage and/or nonvolatile storage, and wherein said computer readable program code which causes said at least one programmable computer processor to manage said information, causes said at least one programmable computer processor to store said information in said cache storage and/or nonvolatile storage.

18. The computer program product of claim 13, wherein said data storage of said target data storage system comprises cache storage and/or nonvolatile storage and disk data storage, and wherein said computer readable program code causes said at least one programmable computer processor to initially store said received point in time copy data in said cache storage and/or nonvolatile storage and to destage said received point in time copy data to said disk data storage in a predetermined manner.

19. An information handling system, comprising:
a source data storage system for providing a point in time copy of data; said source data storage system comprising:
data storage for storing said point in time copy data;
a controller for managing said point in time copy data; and
a peer-to-peer communication link interface; and
a target data storage system for providing access to data of said point in time copy, said target data storage system comprising:
a peer-to-peer communication link interface for linking said target data storage system to peer-to-peer communication link interface of said source data storage system;
data storage for storing point in time copy data received from said source data storage system via said peer-to-peer communication link interface;
a table establishing information relating logical identification of said point in time copy data to point in time copy data stored at said target data storage system and to point in time copy data stored at said source data storage system, such that said information of said table may reference the one of said data storage systems having requested point in time copy data; and
a controller accessing requested point in time copy data at said target data storage system if said information of said table indicates that said requested point in time copy data is available at said target data storage system; else obtaining said requested point in time copy data from said source data storage system via said peer-to-peer communication link interfaces.

20. The information handing system of claim 19, wherein said target data storage system controller obtains said requested point in time copy data from said source data storage system by sending at least one command to said source data storage system via said peer-to-peer communication link interfaces, and receives obtained data from said source data storage system via said peer-to-peer communication link interfaces.

21. The information handing system of claim 20, wherein said target data storage system controller establishes said information of said table comprising said logical identification of said point in time copy data, and additionally updates said information of said table to identify which said data storage system presently stores data of said point in time copy, and the present status of said data of said point in time copy.

22. The information handing system of claim 21, wherein said source data storage system supplies said logical identification of said point in time copy data to said target data storage system via said peer-to-peer communication interfaces.

23. The information handing system of claim 21, wherein said target data storage system comprises cache storage and/or nonvolatile storage, and said information of said table is stored in said cache storage and/or nonvolatile storage.

24. The information handing system of claim 19, wherein said data storage of said target data storage system comprises cache storage and/or nonvolatile storage and disk data storage, and said point in time copy data received from said source data storage is initially stored in said cache storage and/or nonvolatile storage and destaged to said disk data storage in a predetermined manner.

25. A method for providing a point in time copy of data between a source data storage system and a target data storage system; said target data storage system comprising: a peer-to-peer communication link interface for linking said target data storage system to a source data storage system; and data storage for storing point in time copy data received from said source data storage system via said peer-to-peer communication link interface; said method comprising the steps of:
establishing at said target data storage system information relating logical identification of said point in time copy data to point in time copy data stored at said target data storage system and to point in time copy data stored at said source data storage system, to reference the one of said data storage systems having requested point in time copy data;
accessing requested point in time copy data at said target data storage system if said established information indicates that said requested point in time copy data is available at said target data storage system;
else, obtaining said requested point in time copy data from said source data storage system to said target data storage system via said peer-to-peer communication link interface.

26. The method of claim 25, wherein said step of obtaining said requested point in time copy data from said source data storage system comprises sending at least one command to said source data storage system via said peer-to-peer communication link interface, and receiving obtained data from said source data storage system via said peer-to-peer communication link interface.

27. The method of claim 26, wherein said step of establishing said information comprises establishing logical identification of said point in time copy data, and updating said information to identify which said data storage system presently stores data of said point in time copy, and the present status of said data of said point in time copy.

28. The method of claim 27, wherein said logical identification of said point in time copy data is received from said source data storage system via said peer-to-peer communication link interface.

29. The method of claim 27, wherein said target data storage system comprises cache storage and/or nonvolatile storage, and said step of establishing said information comprises storing said information in said cache storage and/or nonvolatile storage.

30. The method of claim 25, wherein said data storage of said target data storage system comprises cache storage and/or nonvolatile storage and disk data storage, and said method additionally comprises the steps of initially storing said received point in time copy data in said cache storage and/or nonvolatile storage and destaging said received point in time copy data to said disk data storage in a predetermined manner.

* * * * *